Goodrich & Colburn.
Self-Oiling Pulley
N° 89,652.                    Patented May 4, 1869.

Witnesses;
Thos. H. Dodge
E. G. Spaulding

Inventors;
J. Goodrich
H. J. Colburn

United States Patent Office.

J. GOODRICH AND H. J. COLBURN, OF FITCHBURG, MASSACHUSETTS, ASSIGNOR TO ROLLSTONE MACHINE WORKS, OF SAME PLACE.

Letters Patent No. 89,652, dated May 4, 1869.

IMPROVEMENT IN SELF-OILING PULLEYS.

The Schedule referred to in these Letters Patent and making part of the same.

*Know all men by these presents:*

That we, J. GOODRICH and H. J. COLBURN, both of Fitchburg, in the county of Worcester, and Commonwealth of Massachusetts, have invented certain new and useful Improvements in Self-Oiling Pulleys; and we do hereby declare that the following is a full, clear, and exact description of the same, reference being had to the accompanying drawings, forming a part of this specification, in which—

Figure 1:
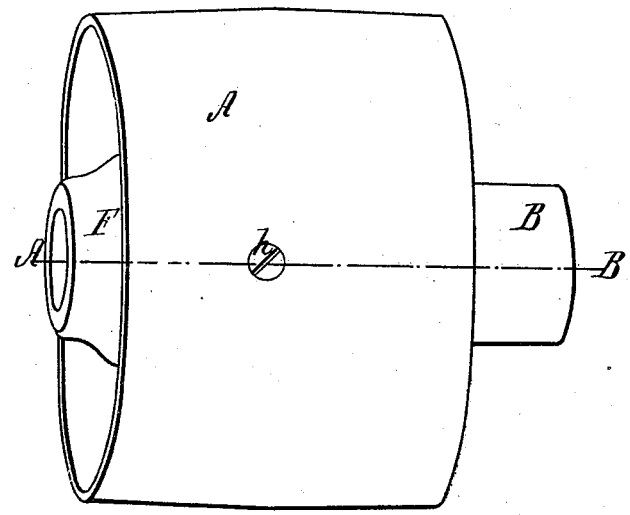
Figure 2:
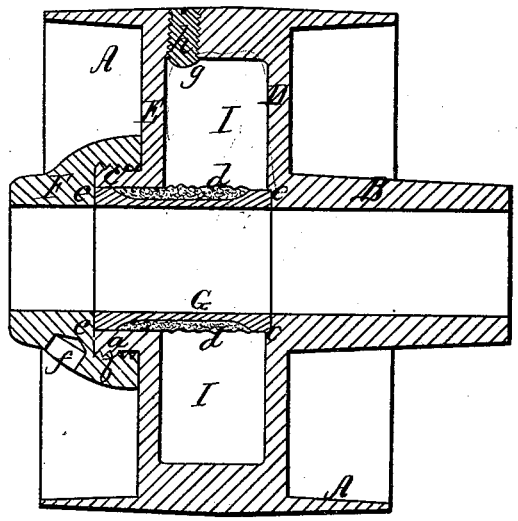

Figure 1 represents a perspective view of a loose pulley with our improvements applied thereto; and Figure 2 represents a longitudinal central section on line A B, fig. 1.

To enable those skilled in the art to which our invention belongs, to make and use the same, we will describe it more in detail.

Numerous inventions have been made and applied to loose pulleys for the purpose of obviating the necessity of frequent oiling, and at the same time insuring the proper lubricating of the rubbing or bearing-surfaces.

Some of these devices have proved of much utility, but to all of them we believe more or less objections exist, and it was with a view to produce a self-oiling pulley superior to those in use that our experiments were made which resulted in our present improvements.

In the drawings A is the rim of the pulley, connected to the long and short hubs B and C by the webs D and E.

The short hub C has a screw-thread, $a$, to fit the screw-thread $b$ in the hub-nut F.

The pulley is cored out between the flanges D E, as indicated in fig. 2, while the hole through the short hub C is bored or chucked out somewhat larger than the hole through the long hub B.

The hole in hub B is, however, chucked or bored out larger on the inside to form a shoulder or flange $c$ to support the inner end of the bushing G, the outer end of which bushing just fits the hole through hub C.

The outer surface of bushing G is in this instance turned down to receive the fibrous material $d$, which is wound about the bushing as indicated in the drawings.

The length of the bushing is such that when hub-nut F is turned or screwed down, as indicated in the drawings, the bushing will be held firm between the shoulder $c$ on hub B, and shoulder $e$, on hub-nut F, thereby making oil-tight joints at both ends of bushing G.

Nut F may be made so that it can be turned by a common wrench, but we prefer to make it as shown in the drawings, with one or more holes $f$ to receive the fork or forks of a cant-wrench, by which it can be easily turned off or on as occasion may require.

The space or chamber I is to be filled with oil or some proper lubricating-substance, the same being turned in through hole $g$, which is closed by a screw, $h$.

The bushing G is made of wood, and when the pulley is in use, sufficient oil or lubricating-substance will pass slowly through the pores of the wood to keep the pulley sufficiently lubricated. The process is so slow and gradual, however, that the oil or lubricating-substance never drops from the ends of the hubs Then again, in the passage through the pores of the wooden bushing of the lubricating-substance, all dirt, gumming, or clogging matter is arrested and separated from the oily substance, thus rendering the pulley less liable to become clogged or gummed up, than it is when the oil is applied through cotton or wool-waste.

It will be understood that the form of the pulley may be varied to suit the tastes of manufacturers, the rim A being supported by arms arranged in any of the common modes.

The fibrous coating $d$ may be dispensed with without materially affecting the utility of the device, and the bushing may be secured in a different manner without departing from the principle of our invention.

Having described our self-oiling pulley,

What we claim therein as new, and of our invention, and desire to secure by Letters Patent, is—

1. The combination with the hubs B and C of the wooden bushing G, and hub-nut F, substantially as and for the purposes set forth.

2. The combination with the rim A, hubs B and C, flanges or webs D E, of the wooden bushing G, and hub-nut F, substantially as and for the purposes set forth.

J. GOODRICH,
H. J. COLBURN.

Witnesses:
THOS. H. DODGE,
E. G. SPAULDING.